United States Patent [19]
Wiedeman et al.

[11] Patent Number: 5,812,538
[45] Date of Patent: *Sep. 22, 1998

[54] MULTIPLE SATELLITE REPEATER CAPACITY LOADING WITH MULTIPLE SPREAD SPECTRUM GATEWAY ANTENNAS

[75] Inventors: Robert A. Wiedeman, Los Altos; Paul A. Monte, San Jose; Stephen S. Carter, San Diego; William Ames, Poway, all of Calif.

[73] Assignees: Globalstar L.P., San Jose; Qualcomm Incorporated, San Diego, both of Calif.

[ * ] Notice: The term of this patent shall not extend beyond the expiration date of Pat. No. 5,592,481.

[21] Appl. No.: 778,882

[22] Filed: Jan. 3, 1997

Related U.S. Application Data

[63] Continuation of Ser. No. 465,972, Jun. 6, 1995, Pat. No. 5,592,481.

[51] Int. Cl.$^6$ .................................................. H04B 7/185
[52] U.S. Cl. ........................ 370/316; 370/320; 455/12.1; 455/353
[58] Field of Search ........................... 370/316, 320–328; 455/427–430, 12.1–13.4, 98; 342/352–358

[56] References Cited

U.S. PATENT DOCUMENTS

| | | | |
|---|---|---|---|
| Re. 32,905 | 4/1989 | Baran | 370/104 |
| 4,901,307 | 2/1990 | Gilhousen et al. | 370/18 |
| 4,983,980 | 1/1991 | Ando | 342/357 |

(List continued on next page.)

FOREIGN PATENT DOCUMENTS

| | | |
|---|---|---|
| 0 421 698 A3 | 10/1991 | European Pat. Off. . |
| 0 536 033 A2 | 4/1993 | European Pat. Off. . |
| 0 536 921 A1 | 4/1993 | European Pat. Off. . |
| WO 90/13186 | 11/1990 | WIPO . |
| WO 91/09473 | 6/1991 | WIPO . |

OTHER PUBLICATIONS

"Digital Network Oriented Mobile Radio Satellite System as an Integrated Part of the GSM Cellular Radio System in Europe", P. Dondl, Deutsch Bundespost/Fernmeldetechniches Zentralmt/Darmstadt Sep. 21, 1989, Germany.

(List continued on next page.)

Primary Examiner—Douglas W. Olms
Assistant Examiner—David R. Vincent
Attorney, Agent, or Firm—Perman & Green, LLP

[57] ABSTRACT

A communication system (10), and a method executed by same, for allocating communications traffic through a plurality of satellites (12) of a constellation of low earth orbit satellites. Each of the plurality of satellites is oriented, at any given time when in view of a ground station (18), at a particular elevation angle. The method comprises the steps of: (a) providing each of the plurality of satellites with a receiver for receiving communication links from the ground station and a transmitter for transmitting communication links to user terminals; (b) in response to a request for service, determining if a highest elevation angle satellite can be assigned a new communications link; (c) if yes, assigning a new communication link to the highest elevation angle satellite; (d) if no, determining if a second highest elevation angle satellite can be assigned a new communications link; and (e) if yes, assigning a new communication link to the second highest elevation angle satellite. A number of different criteria can be employed in determining if a satellite can be assigned a new communication link, including: determining if the associated satellite has already been assigned a predetermined maximum number of communication links; and determining if the associated satellite, or a particular beam, is transmitting at or near to a power level that corresponds to a maximum peak flux density at the surface of the earth. Each of the steps of assigning is preferably accomplished such that the communication link is simultaneously established through at least two of the satellites to provide for diversity reception at a user's terminal (13).

3 Claims, 7 Drawing Sheets

U.S. PATENT DOCUMENTS

| | | | |
|---|---|---|---|
| 5,010,317 | 4/1991 | Schwendeman et al. | 340/311.1 |
| 5,073,900 | 12/1991 | Mallinckrodt | 375/1 |
| 5,081,703 | 1/1992 | Lee | 455/13 |
| 5,109,390 | 4/1992 | Gilhousen et al. | 375/1 |
| 5,119,225 | 6/1992 | Grant et al. | 359/172 |
| 5,216,427 | 6/1993 | Yan et al. | 342/352 |
| 5,233,626 | 8/1993 | Ames | 375/1 |
| 5,239,671 | 8/1993 | Linquist et al. | 455/13.1 |
| 5,303,286 | 4/1994 | Wiedeman | 379/59 |
| 5,339,330 | 8/1994 | Mallinckrodt | 375/1 |
| 5,408,237 | 4/1995 | Patterson | 342/354 |
| 5,410,728 | 4/1995 | Bertiger et al. | 455/13.1 |
| 5,415,368 | 5/1995 | Horstein et al. | 244/158 |
| 5,422,647 | 6/1995 | Hirshfield et al. | 342/354 |
| 5,433,726 | 7/1995 | Horstein et al. | 244/158 |
| 5,439,190 | 8/1995 | Horstein et al. | 244/158 |
| 5,446,756 | 8/1995 | Mallinckrodt | 375/200 |
| 5,448,623 | 9/1995 | Wiedeman et al. | 379/59 |

OTHER PUBLICATIONS

"The Iridium™[1] System—A Revolutionary Satellite Communications System Developed with Innovative Applications of Technology", D. Sterling et al., IEEE, MILCOM 1991, Nov. 4–7.

"Iridium: Key to Worldwide Cellular Communications", J. Foley, Telecommunications, Oct. 1991, pp. 23–28.

"The OmniTRACS Mobile Satellite Communications and Positioning System", E. Tiedemann, Jr. et al, Vehicle Electronics in the 90's: Proceedings of the In'l. Congress on Transportation Electronics, Oct. 1990.

"Software Implementation of a PN Spread Spectrum Receiver to Accommodate Dynamics", C. Cahn et al., IEEE Trans. on Comm., vol. COM–25, No. 8, Aug. 1977.

Petition of American Mobile Satellite Corporation Before the FCC, Washington, DC 20554, dated Jun. 3, 1991, pp. 1–15.

Application of Motorola Satellite Communications, Inc. for IRIDIUM A Low Earth Orbit Mobile Satellite System before the FCC, Washington, D.C. Dec. 1990, pp. 49–96.

Before the FCC, Washington, D.C. 20554, Aries Constellation Low Earth Orbit Satellite System Proposal of Constellation Communications, Inc. Jun. 3, 1991, Appendix A, B, and C.

Application of TRW Inc. for Authority to Construct a New Communications Satellite System Odyssey[SM] before the FCC, Washington, D.C. 20554, May 31, 1991 pp. 33–51.

Application of Ellipsat Corporation ELLIPSAT for the Authority to Construct ELLIPSO®I An Elliptical Orbit Satellite System, before the FCC, Washington, D.C. 20554, Nov. 2, 1990, pp. 5–34.

Application of Loral Cellular Systems, Corp., Globalstar Mobile Communications Wherever You Are, before the FCC, Washington, D.C. Jun. 3, 1991, pp. 94–187.

"A Communication Technique For Multipath Channels" by R. Price and P.E. Green, Proceedings Of The IRE 1958, pp. 555–570.

"Increased Capacity Using CDMA For Mobile Satellite Communication" IEEE Journal, vol. 8, No. 4, May 1990, pp. 503–514. by K. Gilhousen, I. Jacobs, R. Padovani and L. Weaver, Jr.

"An Integrated Satellite–Cellular Land Mobile System for Europe", E. Del Re, University of Florence, Dept. of Electronics Engineering, Italy, Sep. 21, 1989.

"Current and Future Mobile Satellite Communication Systems", S. Kato et al., IEICE Transactions, vol. E74, No. 8, Aug. 1991, pp. 2201–2210.

Axel Bottcher et al., "Strategies for Handover Control in Low Earth Orbit Satellite Systems", IEEE 1994, pp. 1616–1620.

Marco Carosi et al., "Architecture Definition For Small Satellite Personal Communications Systems", Feb. 11, 1993, pp. 330–335.

MULTIPLE SATELLITE REPEATER CAPACITY LOADING WITH MULTIPLE SPREAD SPECTRUM GATEWAY ANTENNAS

CROSS-REFERENCE TO A RELATED PATENT APPLICATION

This patent application is a continuation of U.S. patent application Ser. No. 08/465,972, filed Jun. 6, 1995, now U.S. Pat. No. : 5,592,481, issued on Jan. 7, 1997.

Field of the Invention

This invention relates in general to repeater-based communication systems.

BACKGROUND OF THE INVENTION

Satellite-based communications systems are well represented in the prior art. By example, reference is made to U.S. Pat. No. 5,303,286, which issued on Apr. 12, 1994 to one of the inventors of this patent application, and which is entitled "Wireless Telephone/Satellite Roaming System". Reference is also made to the numerous U.S. Patents, foreign patents, and other publications that are of record in U.S. Pat. No. 5,303,286.

SUMMARY OF THE INVENTION

This invention is directed to a communication system, and to a method executed by same, for allocating communications traffic through a plurality of satellites of a constellation of low earth orbit satellites. Each of the plurality of satellites is oriented, at any given time when in view of a ground station, at a particular elevation angle. The method comprises the steps of (a) providing each of the plurality of satellites with a receiver for receiving communication links from the ground station and a transmitter for transmitting received communication links to user terminals; (b) in response to a request for service, determining if a highest elevation angle satellite can be assigned a new communications link; (c) if yes, assigning a new communication link to the highest elevation angle satellite; (d) if no, determining if a second highest elevation angle satellite can be assigned a new communications link; and (e) if yes, assigning a new communication link to the second highest elevation angle satellite. Alternatively, a plurality of the satellites can be employed to transmit the communication link to the user terminal.

A number of criteria can be employed in determining if a satellite can be assigned a new communication link. For example, each of the steps of determining may each include a step of determining if the associated satellite has already been assigned a predetermined maximum number of communication links. Also by example, each of the steps of determining may each include a step of determining if the associated satellite is transmitting at or near to a power level that corresponds to a maximum peak flux density at the surface of the earth. Further by example, it can be determined if a given satellite is transmitting at or near the satellite's peak transmit power. A further determination can be based on which satellite will be in view of both the user and the gateway for some predetermined period of time.

In a presently preferred embodiment of this invention each satellite transmits a plurality of beams to the earth. Thus, and in accordance with a further embodiment of the method, each of the steps of determining may each include a step of determining if a beam to which the new communication link would be assigned is operating at a maximum predetermined power level, or is transmitting at or near to a power level that corresponds to a maximum peak flux density.

The use of various combinations of the foregoing criteria can also be employed when assigning satellites for new or handoff communications.

Further in accordance with a presently preferred embodiment of this invention each of the steps of assigning include the further steps of: (i) determining if the communication link is to be operated in a diversity reception mode at the corresponding user's terminal; (ii) if yes, determining if at least one next lower elevation angle satellite can be assigned a new communications link; and (iii) if yes, also assigning the communication link to the next lower elevation angle satellite such that the communication link is simultaneously established through at least two of the satellites.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
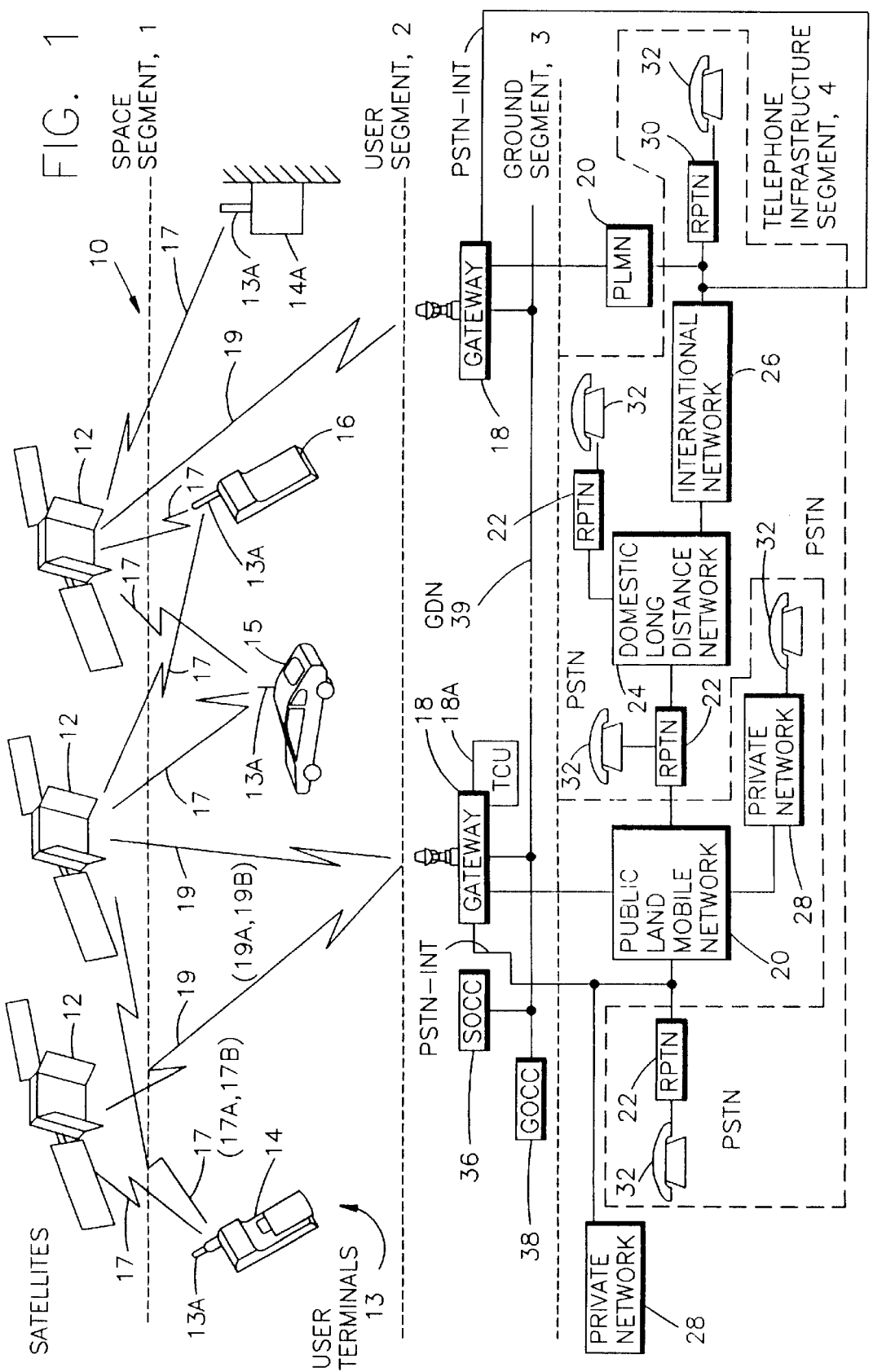
FIG. 1 is block diagram of a satellite communication system that is constructed and operated in accordance with a presently preferred embodiment of this invention.

FIG. 1 illustrates a presently preferred embodiment of a satellite communication system 10 that is suitable for use with the presently preferred embodiment of this invention. Before describing this invention in detail, a description will first be made of the communication system 10 so that a more complete understanding may be had of the present invention.

The communications system 10 may be conceptually sub-divided into a plurality of segments 1, 2, 3 and 4. Segment 1 is referred to herein as a space segment, segment 2 as a user segment, segment 3 as a ground (terrestrial) segment, and segment 4 as a telephone system infrastructure segment.

In the presently preferred embodiment of this invention there are a total of 48 satellites in, by example, a 1414 km Low Earth Orbit (LEO). The satellites 12 are distributed in eight orbital planes with six equally-spaced satellites per plane (Walker constellation). The orbital planes are inclined at 52 degrees with respect to the equator and each satellite completes an orbit once every 114 minutes. This approach provides approximately full-earth coverage with, preferably, at least two satellites in view at any given time from a particular user location between about 70 degree south latitude and about 70 degree north latitude. As such, a user is enabled to communicate to or from nearly any point on the earth's surface within a gateway (GW) 18 coverage area to or from other points on the earth's surface (by way of the PSTN), via one or more gateways 18 and one or more of the satellites 12, possibly also using a portion of the telephone infrastructure segment 4.

It is noted at this point that the foregoing and ensuing description of the system 10 represents but one suitable embodiment of a communication system within which the teaching of this invention may find use. That is, the specific details of the communication system are not to be read or construed in a limiting sense upon the practice of this invention.

Continuing now with a description of the system 10, a soft transfer (handoff) process between satellites 12, and also between individual ones of 16 spot beams transmitted by each satellite (FIG. 3B), provides unbroken communications via a spread spectrum (SS), code division multiple access (CDMA) technique. The presently preferred SS-CDMA technique is similar to the TIA/EIA Interim Standard, "Mobile Station-Base Station Compatibility Standard for Dual-Mode Wideband Spread Spectrum Cellular System" TIA/EIA/IS-95, July 1993, although other spread spectrum and CDMA techniques and protocols can be employed.

The low earth orbits permit low-powered fixed or mobile user terminals 13 to communicate via the satellites 12, each of which functions, in a presently preferred embodiment of this invention, solely as a "bent pipe" repeater to receive a communications traffic signal (such as speech and/or data) from a user terminal 13 or from a gateway 18, convert the received communications traffic signal to another frequency band, and to then re-transmit the converted signal. That is, no on-board signal processing of a received communications traffic signal occurs, and the satellite 12 does not become aware of any intelligence that a received or transmitted communications traffic signal may be conveying.

Furthermore, there need be no direct communication link or links between the satellites 12. That is, each of the satellites 12 receives a signal only from a transmitter located in the user segment 2 or from a transmitter located in the ground segment 3, and transmits a signal only to a receiver located in the user segment 2 or to a receiver located in the ground segment 3.

The user segment 2 may include a plurality of types of user terminals 13 that are adapted for communication with the satellites 12. The user terminals 13 include, by example, a plurality of different types of fixed and mobile user terminals including, but not limited to, handheld mobile radio-telephones 14, vehicle mounted mobile radio-telephones 15, paging/messaging-type devices 16, and fixed radio-telephones 14a. The user terminals 13 are preferably provided with omnidirectional antennas 13a for bidirectional communication via one or more of the satellites 12.

It is noted that the fixed radio-telephones 14a may employ a directional antenna. This is advantageous in that it enables a reduction in interference with a consequent increase in the number of users that can be simultaneously serviced with one or more of the satellites 12.

It is further noted that the user terminals 13 may be dual use devices that include circuitry for also communicating in a conventional manner with a terrestrial cellular system.

Figure 3A:
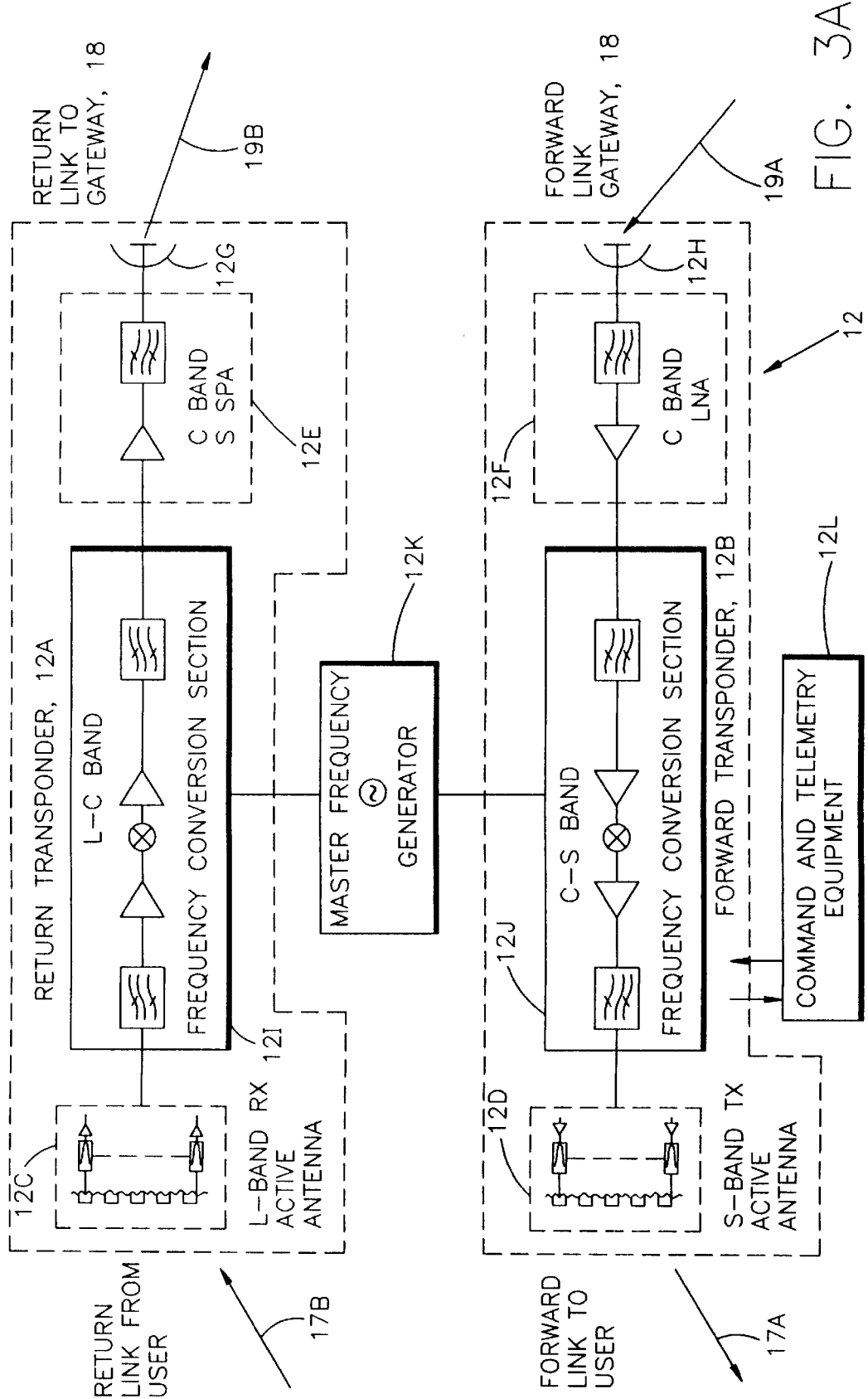
FIG. 3A is a block diagram of the communications payload of one of the satellites of FIG. 1.

Referring also to FIG. 3A, the user terminals 13 may be capable of operating in a full duplex mode and communicate via, by example, L-band RF links (uplink or return link 17b) and S-band RF links (downlink or forward link 17a) through return and forward satellite transponders 12a and 12b, respectively. The return L band RF links 17b may operate within a frequency range of 1.61 GHz to 1.625 GHz, a bandwidth of 16.5 MHz, and are modulated with packetized digital voice signals and/or data signals in accordance with the preferred spread spectrum technique. The forward S band RF links 17a may operate within a frequency range of 2.485 GHz to 2.5 GHz, a bandwidth of 16.5 MHz. The forward RF links 17a are also modulated at a gateway 18 with packetized digital voice signals and/or data signals in accordance with the spread spectrum technique.

The 16.5 MHz bandwidth of the forward link is partitioned into 13 channels with up to, by example, 128 users being assigned per channel. The return link may have various bandwidths, and a given user terminal 13 may or may not be assigned a different channel than the channel assigned on the forward link. However, when operating in the diversity reception mode on the return link (receiving from two or more satellites 12), the user is assigned the same forward and return link RF channel for each of the satellites.

The ground segment 3 includes at least one but generally a plurality of the gateways 18 that communicate with the satellites 12 via, by example, a full duplex C band RF link 19 (forward link 19a (to the satellite), return link 19b (from the satellite)) that operates within a range of frequencies generally above 3 GHz and preferably in the C-band. The C-band RF links bi-directionally convey the communication feeder links, and also convey satellite commands to the satellites and telemetry information from the satellites. The forward feeder link 19a may operate in the band of 5 GHz to 5.25 GHz, while the return feeder link 19b may operate in the band of 6.875 GHz to 7.075 GHz.

The satellite feeder link antennas 12g and 12h are preferably wide coverage antennas that subtend a maximum earth coverage area as seen from the LEO satellite 12. In the presently preferred embodiment of the communication system 10 the angle subtended from a given LEO satellite 12 (assuming 10° elevation angles from the earth's surface) is approximately 110°. This yields a coverage zone that is approximately 3600 miles in diameter.

Figure 3B:
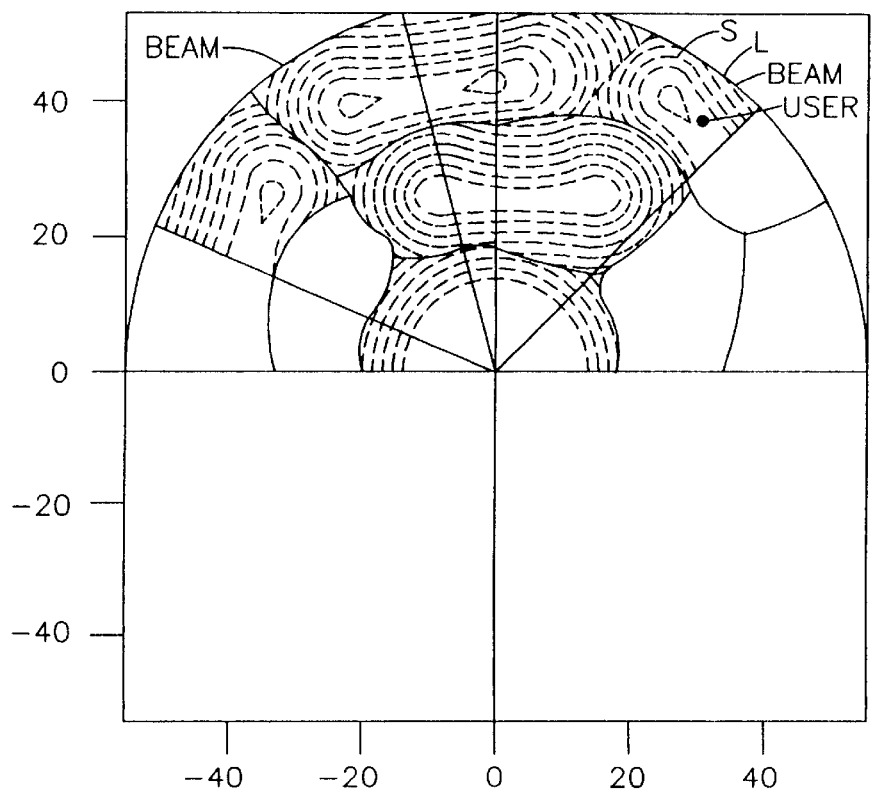
FIG. 3B illustrates a portion of the beam pattern that is transmitted from one of the satellites of FIG. 1.

The L-band and the S-band antennas are multiple beam antennas that provide coverage within an associated terrestrial service region. The L-band and S-band antennas 12d and 12c, respectively, are preferably congruent with one another, as depicted in FIG. 3B. That is, the transmit and receive beams from the spacecraft cover the same area on the earth's surface, although this feature is not critical to the operation of the system 10.

As an example, several thousand full duplex communications may occur through a given one of the satellites 12. In accordance with a feature of the system 10, two or more satellites 12 may each convey the same communication between a given user terminal 13 and one of the gateways 18. This mode of operation, as described in detail below, thus provides for diversity combining at the respective receivers, leading to an increased resistance to fading and facilitating the implementation of a soft handoff procedure.

It is pointed out that all of the frequencies, bandwidths and the like that are described herein are representative of but one particular system. Other frequencies and bands of frequencies may be used with no change in the principles being discussed. As but one example, the feeder links between the gateways and the satellites may use frequencies in a band other than the C-band (approximately 3 GHz to approximately 7 GHz), for example the Ku band (approximately 10 GHz to approximately 15 GHz) or the Ka band (above approximately 15 GHz).

The gateways 18 function to couple the communications payload or transponders 12a and 12b (FIG. 3A) of the satellites 12 to the telephone infrastructure segment 4. The transponders 12a and 12b include an L-band receive antenna 12c, S-band transmit antenna 12d, C-band power amplifier 12e, C-band low noise amplifier 12f, C-band antennas 12g and 12h, L band to C band frequency conversion section 12i, and C band to S band frequency conversion section 12j. The satellite 12 also includes a master frequency generator 12k and command and telemetry equipment 12l.

Reference in this regard may also be had to U.S. Pat. No. 5,422,647, by E. Hirshfield and C. A. Tsao, entitled "Mobile Communications Satellite Payload" (U.S. Ser. No. 08/060,207).

The telephone infrastructure segment 4 is comprised of existing telephone systems and includes Public Land Mobile Network (PLMN) gateways 20, local telephone exchanges such as regional public telephone networks (RPTN) 22 or other local telephone service providers, domestic long distance networks 24, international networks 26, private networks 28 and other RPTNs 30. The communication system 10 operates to provide bidirectional voice and/or data communication between the user segment 2 and Public Switched Telephone Network (PSTN) telephones 32 and non-PSTN telephones 32 of the telephone infrastructure segment 4, or other user terminals of various types, which may be private networks.

Also shown in FIG. 1 (and also in FIG. 4), as a portion of the ground segment 3, is a Satellite Operations Control Center (SOCC) 36, and a Ground Operations Control Center (GOCC) 38. A communication path, which includes a Ground Data Network (GDN) 39 (see FIG. 2), is provided for interconnecting the gateways 18 and TCUs 18a, SOCC 36 and GOCC 38 of the ground segment 3. This portion of the communications system 10 provides overall system control functions.

Figure 2:
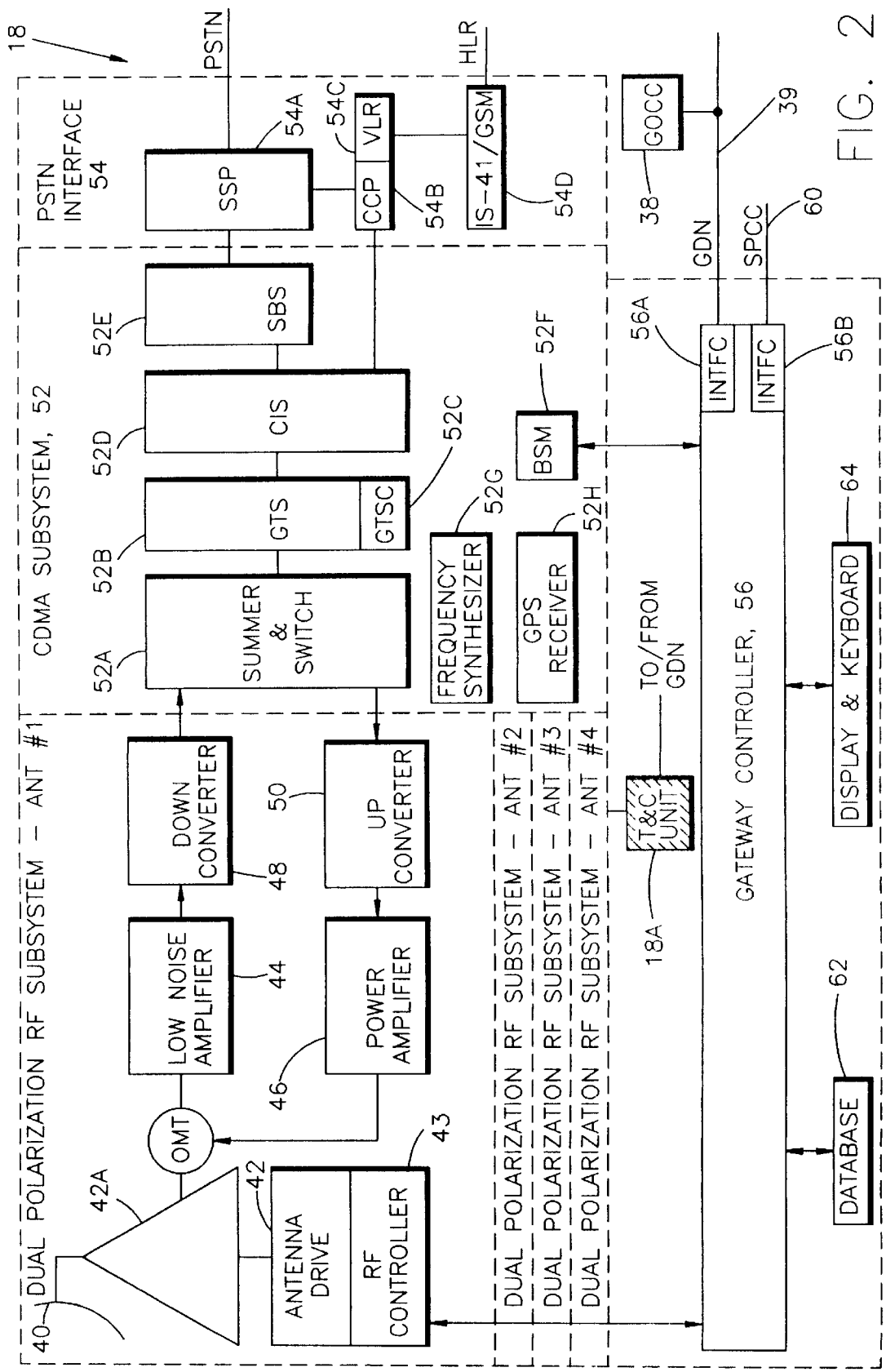
FIG. 2 is a block diagram of one of the gateways of FIG. 1.

FIG. 2 shows one of the gateways 18 in greater detail. Each gateway 18 includes up to four dual polarization RF C-band sub-systems each comprising a dish antenna 40, antenna driver 42 and pedestal 42a, low noise receivers 44, and high power amplifiers 46. All of these components may be located within a radome structure to provide environmental protection.

The gateway 18 further includes down converters 48 and up converters 50 for processing the received and transmitted RF carrier signals, respectively. The down converters 48 and the up converters 50 are connected to a CDMA sub-system 52 which, in turn, is coupled to the Public Switched Telephone Network (PSTN) though a PSTN interface 54. As an option, the PSTN could be bypassed by using satellite-to-satellite links.

The CDMA sub-system 52 includes a signal summer/switch unit 52a, a Gateway Transceiver Subsystem (GTS) 52b, a GTS Controller 52c, a CDMA Interconnect Subsystem (CIS) 52d, and a Selector Bank Subsystem (SBS) 52e. The CDMA sub-system 52 is controlled by a Base Station Manager (BSM) 52f and functions in a manner similar to a CDMA-compatible (for example, an IS-95 compatible) base station. The CDMA sub-system 52 also includes the required frequency synthesizer 52g and a Global Positioning System (GPS) receiver 52h.

The PSTN interface 54 includes a PSTN Service Switch Point (SSP) 54a, a Call Control Processor (CCP) 54b, a Visitor Location Register (VLR) 54c, and a protocol interface 54d to a Home Location Register (HLR). The HLR may be located in the cellular gateway 20 (FIG. 1) or, optionally, in the PSTN interface 54.

The gateway 18 is connected to telecommunication networks through a standard interface made through the SSP 54a. The gateway 18 provides an interface, and connects to the PSTN via Primary Rate Interface (PRI). The gateway 18 is further capable of providing a direct connection to a Mobile Switching Center (MSC).

The gateway 18 provides SS-7 ISDN fixed signalling to the CCP 54b. On the gateway-side of this interface, the CCP 54b interfaces with the CIS 52d and hence to the CDMA sub-system 52. The CCP 54b provides protocol translation functions for the system Air Interface (AI), which may be similar to the IS-95 Interim Standard for CDMA communications.

Blocks 54c and 54d generally provide an interface between the gateway 18 and an external cellular telephone network that is compatible, for example, with the IS-41 (North American Standard, AMPS) or the GSM (European Standard, MAP) cellular systems and, in particular, to the specified methods for handling roamers, that is, users who place calls outside of their home system. The gateway 18 supports user terminal authentication for system 10/AMPS phones and for system 10/GSM phones. In service areas where there is no existing telecommunications infrastructure, an HLR can be added to the gateway 18 and interfaced with the SS-7 signalling interface.

A user making a call out of the user's normal service area (a roamer) is accommodated by the system 10 if authorized. In that a roamer may be found in any environment, a user may employ the same terminal equipment to make a call from anywhere in the world, and the necessary protocol conversions are made transparently by the gateway 18. The protocol interface 54d is bypassed when not required to convert, by example, GSM to AMPS.

It is within the scope of the teaching of this invention to provide a dedicated, universal interface to the cellular gateways 20, in addition to or in place of the conventional "A" interface specified for GSM mobile switching centers and vendor-proprietary interfaces to IS-41 mobile switching centers. It is further within the scope of this invention to provide an interface directly to the PSTN, as indicated in FIG. 1 as the signal path designated PSTN-INT.

Overall gateway control is provided by the gateway controller 56 which includes an interface 56a to the above-mentioned Ground Data Network (GDN) 39 and an interface 56b to a Service Provider Control Center (SPCC) 60. The gateway controller 56 is generally interconnected to the gateway 18 through the BSM 52f and through RF controllers 43 associated with each of the antennas 40. The gateway controller 56 is further coupled to a database 62, such as a database of users, satellite ephemeris data, etc., and to an I/O unit 64 that enables service personnel to gain access to the gateway controller 56. The GDN 39 is also bidirectionally interfaced to a Telemetry and Command (T&C) unit 66 (FIGS. 1 and 4).

Figure 4:
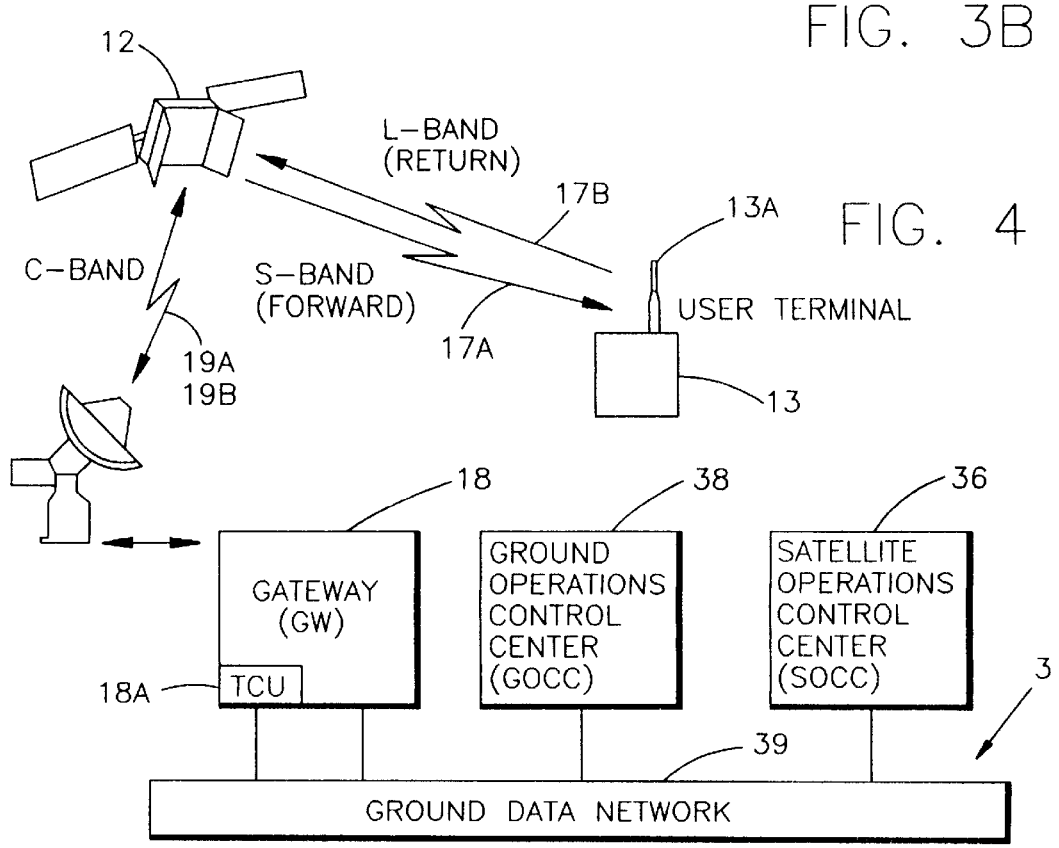
FIG. 4 is a block diagram that depicts the ground equipment support of satellite telemetry and control functions.

Referring to FIG. 4, the function of the GOCC 38 is to plan and control satellite utilization by the gateways 18, and to coordinate this utilization with the SOCC 36. In general, the GOCC 38 analyses trends, generates traffic plans, allocates satellite 12 and system resources (such as, but not limited to, power and channel allocations), monitors the performance of the overall system 10, and issues utilization instructions, via the GDN 39, to the gateways 18 in real time or in advance.

The SOCC 36 operates to maintain and monitor orbits, to relay satellite usage information to the gateway for input to the GOCC 38 via the GDN 39, to monitor the overall functioning of each satellite 12, including the state of the satellite batteries, to set the gain for the RF signal paths within the satellite 12, to ensure optimum satellite orientation with respect to the surface of the earth, in addition to other functions.

As described above, each gateway 18 functions to connect a given user to the PSTN for both signalling, voice and/or data communications and also to generate data, via database 62 (FIG. 2), for billing purposes. Selected gateways 18 include a Telemetry and Command Unit (TCU) 18a for receiving telemetry data that is transmitted by the satellites 12 over the return link 19b and for transmitting commands up to the satellites 12 via the forward link 19a. The GDN 39 operates to interconnect the gateways 18, GOCC 38 and the SOCC 36.

In general, each satellite 12 of the LEO constellation operates to relay information from the gateways 18 to the users (C band forward link 19a to S band forward link 17a), and to relay information from the users to the gateways 18 (L band return link 17b to C band return link 19b). This information includes SS-CDMA synchronization and paging channels, in addition to power control signals. Various CDMA pilot channels may also be used to monitor interference on the forward link. Satellite ephemeris update data is also communicated to each of the user terminals 13, from the gateway 18, via the satellites 12. The satellites 12 also function to relay signalling information from the user terminals 13 to the gateway 18, including access requests, power change requests, and registration requests. The satellites 12 also relay communication signals between the users and the gateways 18, and may apply security to mitigate unauthorized use.

In operation, the satellites 12 transmit spacecraft telemetry data that includes measurements of satellite operational status. The telemetry stream from the satellites, the commands from the SOCC 36, and the communications feeder links 19 all share the C band antennas 12g and 12h. For those gateways 18 that include a TCU 18a the received satellite telemetry data may be forwarded immediately to the SOCC 36, or the telemetry data may be stored and subsequently forwarded to the SOCC 36 at a later time, typically upon SOCC request. The telemetry data, whether transmitted immediately or stored and subsequently forwarded, is sent over the GDN 39 as packet messages, each packet message containing a single minor telemetry frame. Should more than one SOCC 36 be providing satellite support, the telemetry data is routed to all of the SOCCs.

The SOCC 36 has several interface functions with the GOCC 38. One interface function is orbit position information, wherein the SOCC 36 provides orbital information to the GOCC 38 such that each gateway 18 can accurately track up to four satellites that may be in view of the gateway. This data includes data tables that are sufficient to allow the gateways 18 to develop their own satellite contact lists, using known algorithms. The SOCC 36 is not required to known the gateway tracking schedules. The TCU 18a searches the downlink telemetry band and uniquely identifies the satellite being tracked by each antenna prior to the propagation of commands.

Another interface function is satellite status information that is reported from the SOCC 36 to the GOCC 38. The satellite status information includes both satellite/transponder availability, battery status and orbital information and incorporates, in general, any satellite-related limitations that would preclude the use of all or a portion of a satellite 12 for communications purposes.

An important aspect of the system 10 is the use of SS-CDMA in conjunction with diversity combining at the gateway receivers and at the user terminal receivers. Diversity combining is employed to mitigate the effects of fading as signals arrive at the user terminals 13 or the gateway 18 from multiple satellites over multiple and different path lengths. Rake receivers in the user terminals 13 and the gateways 18 are employed to receive and combine the signals from multiple sources. As an example, a user terminal 13 or the gateway 18 provides diversity combining for the forward link signals or the return link signals that are simultaneously received from and transmitted through the multiple beams of the satellites 12.

In this regard the disclosure of U.S. Pat. No. 5,233,626, issued Aug. 3, 1993 to Stephen A. Ames and entitled "Repeater Diversity Spread Spectrum Communication System", is incorporated by reference herein in its entirety.

The performance in the continuous diversity reception mode is superior to that of receiving one signal through one satellite repeater, and furthermore there is no break in communications should one link be lost due to shadowing or blockage from trees or other obstructions that have an adverse impact on the received signal.

The multiple, directional, antennas 40 of a given one of the gateways 18 are capable of transmitting the forward link signal (gateway to user terminal) through different beams of one or more satellites 12 to support diversity combining in the user terminals 13. The omnidirectional antennas 13a of the user terminals 13 transmit through all satellite beams that can be "seen" from the user terminal 13.

Each gateway 18 supports a transmitter power control function to address slow fades, and also supports block interleaving to address medium to fast fades. Power control is implemented on both the forward and reverse links. The response time of the power control function is adjusted to accommodate for a worst case 30 msec satellite round trip delay.

The block interleavers (53d, 53e, 53f, FIG. 5) operate over a block length that is related to vocoder 53g packet frames. An optimum interleaver length trades off a longer length, and hence improved error correction, at the expense of increasing the overall end-to-end delay. A preferred maximum end-to-end delay is 150 msec or less. This delay includes all delays including those due to the received signal alignment performed by the diversity combiners, vocoder 53g processing delays, block interleaver 53d–53f delays, and the delays of the Viterbi decoders (not shown) that form a portion of the CDMA sub-system 52.

Figure 5:
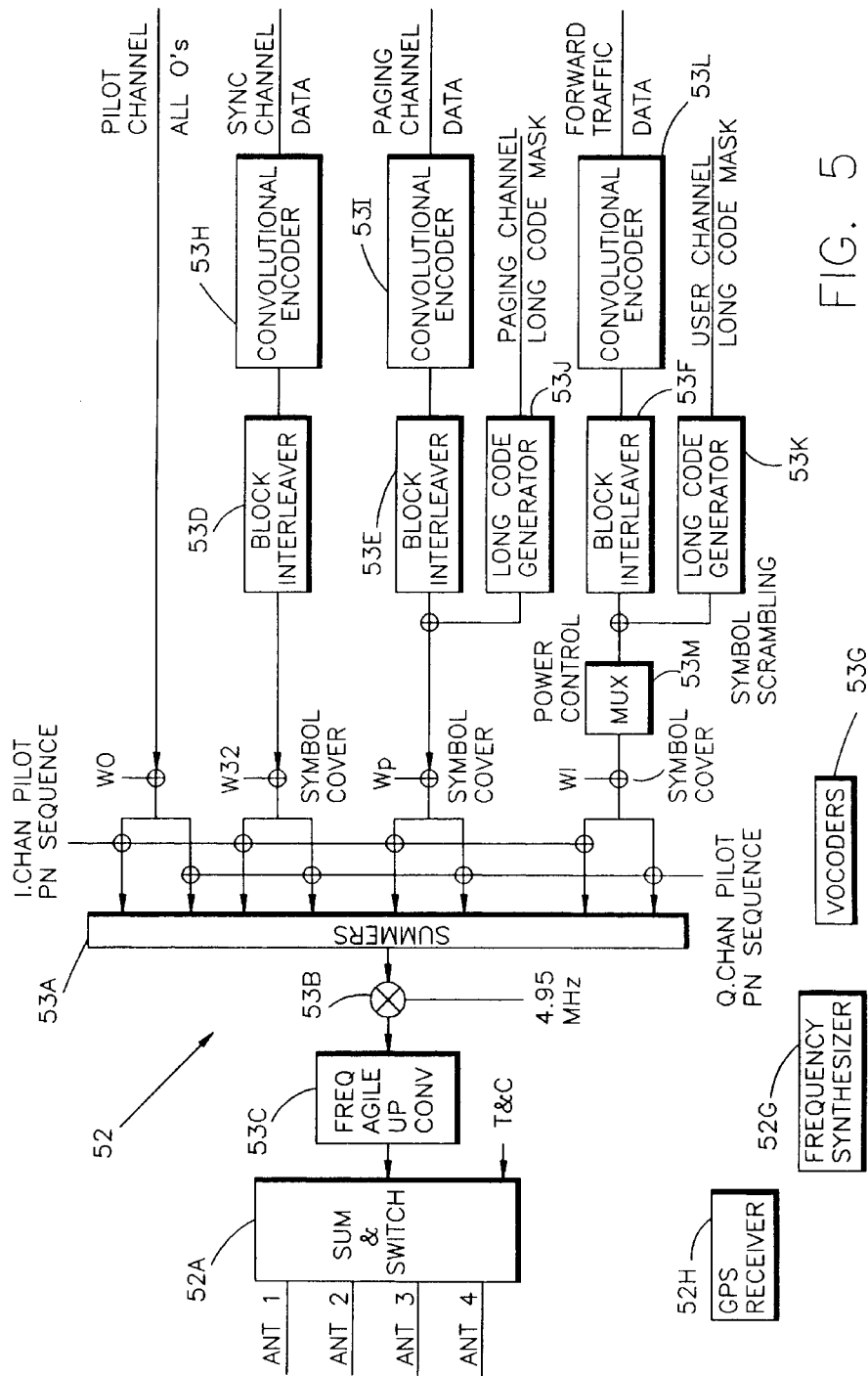
FIG. 5 is block diagram of the CDMA sub-system of FIG. 2.

FIG. 5 is a block diagram of the forward link modulation portion of the CDMA sub-system 52 of FIG. 2. An output of a summer block 53a feeds a frequency agile up-converter 53b which in turn feeds the summer and switch block 52a. The telemetry and control (T&C) information is also input to the block 52a.

An unmodulated direct sequence SS pilot channel generates an all zeros Walsh Code at a desired bit rate. This data stream is combined with a short PN code that is used to separate signals from different gateways 18 and different satellites 12. If used, the pilot channel is modulo 2 added to the short code and is then QPSK or BPSK spread across the CDMA FD RF channel bandwidth. The following different pseudonoise (PN) code offsets are provided: (a) a PN code offset to allow a user terminal 13 to uniquely identify a gateway 18; (b) a PN code offset to allow the user terminal 13 to uniquely identify a satellite 12; and (c) a PN code offset to allow the user terminal 13 to uniquely identify a given one of the 16 beams that is transmitted from the satellite 12. Pilot PN codes from different ones of the satellites 12 are assigned different time/phase offsets from the same pilot seed PN code.

If used, each pilot channel that is transmitted by the gateway 18 may be transmitted at a higher or lower power level than the other signals. A pilot channel enables a user terminal 13 to acquire the timing of the forward CDMA channel, provides a phase reference for coherent demodulation, and provides a mechanism to perform signal strength comparisons to determine when to initiate handoff. The use of the pilot channel is not, however, mandatory, and other techniques can be employed for this purpose.

The Sync channel generates a data stream that includes the following information: (a) time of day; (b) transmitting gateway identification; (c) satellite ephemeris; and (d) assigned paging channel. The Sync data is applied to a convolution encoder 53$h$ where the data is convolutionally encoded and subsequently block interleaved to combat fast fades. The resulting data stream is modulo two added to the synchronous Walsh code and QPSK or BPSK spread across the CDMA FD RF channel bandwidth.

The Paging channel is applied to a convolutional encoder 53$i$ where it is convolutionally encoded and is then block interleaved. The resulting data stream is combined with the output of a long code generator 53$j$. The long PN code is used to separate different user terminal 13 bands. The paging channel and the long code are modulo two added and provided to a symbol cover where the resulting signal is modulo two added to the Walsh Code. The result is then QPSK or BPSK spread across the CDMA FD RF channel bandwidth.

In general, the paging channel conveys several message types which include: (a) a system parameter message; (b) an access parameter message; and (c) a CDMA channel list message.

The system parameter message includes the configuration of the paging channel, registration parameters, and parameters to aid in acquisition. The access parameters message includes the configuration of the access channel and the access channel data rate. The CDMA channel list message conveys, if used, an associated pilot identification and Walsh code assignment.

The vocoder 53$k$ encodes the voice into a PCM forward traffic data stream. The forward traffic data stream is applied to a convolutional encoder 53$l$ where it is convolutionally encoded and then block interleaved in block 53$f$. The resulting data stream is combined with the output of a user long code block 53$k$. The user long code is employed to separate different subscriber channels. The resulting data stream is then power controlled in multiplexer (MUX) 53$m$, modulo two added to the Walsh code, and then QPSK or BPSK spread across the CDMA FD RF communication channel bandwidth.

The gateway 18 operates to demodulate the CDMA return link(s). There are two different codes for the return link: (a) the zero offset code; and (b) the long code. These are used by the two different types of return link CDMA Channels, namely the access channel and the return traffic channel.

For the access channel the gateway 18 receives and decodes a burst on the access channel that requests access. The access channel message is embodied in a long preamble followed by a relatively small amount of data. The preamble is the user terminal's long PN code. Each user terminal 13 has a unique long PN code generated by a unique time offset into the common PN generator polynomial.

After receiving the access request, the gateway 18 sends a message on the forward link paging channel (blocks 53$e$, 53$i$, 53$j$) acknowledging receipt of the access request and assigning a Walsh code to the user terminal 13 to establish a traffic channel. The gateway 18 also assigns a frequency channel to the user terminal 13. Both the user terminal 13 and the gateway 18 switch to the assigned channel element and begin duplex communications using the assigned Walsh (spreading) code(s).

The return traffic channel is generated in the user terminal 13 by convolutionally encoding the digital data from the local data source or the user terminal vocoder. The data is then block interleaved at predetermined intervals and is applied to a 128-Ary modulator and a data burst randomizer to reduce clashing. The data is then added to the zero offset PN code and transmitted through one or more of the satellites 12 to the gateway 18.

The gateway 18 processes the return link by using, by example, a Fast Hadamard Transform (FHT) to demodulate the 128-Ary Walsh Code and provide the demodulated information to the diversity combiner.

The foregoing has been a description of a presently preferred embodiment of the communication system 10. A description is now made of presently preferred embodiments of the present invention.

Figure 6:
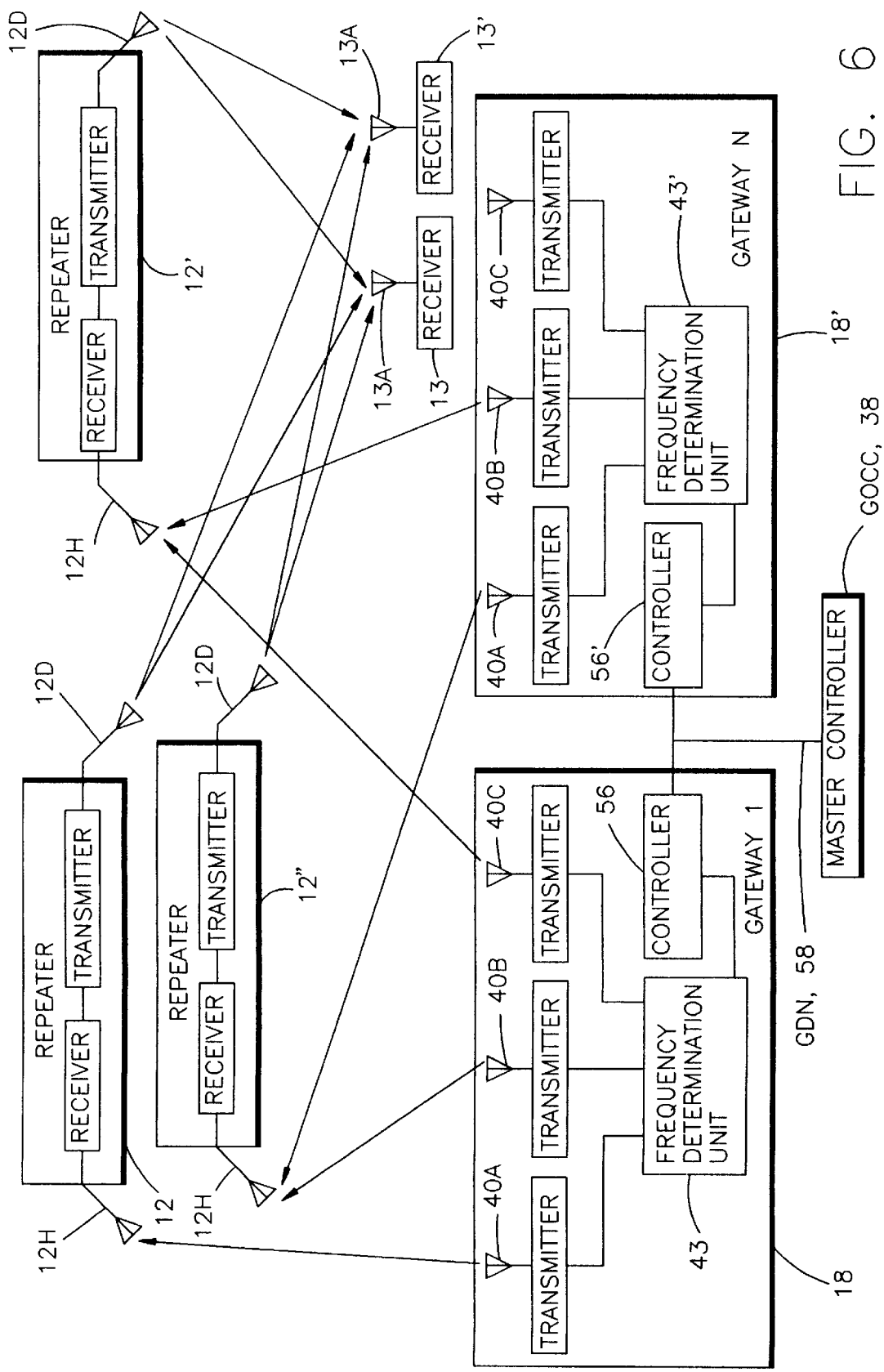
FIG. 6 is a simplified system block diagram that is useful in illustrating the teaching of this invention.

FIG. 6 is a simplified system block diagram that is useful in illustrating the teaching of this invention. System elements that have been described above are numbered accordingly in FIG. 6. Two gateways 18 (designated 18 and 18') are illustrated as transmitting through three satellites 12. The satellites 12 are designated as 12, having a highest elevation angle, satellite 12', having a second highest elevation angle, and satellite 12'', having a lowest elevation angle.

A first forward link is established by frequency determining unit 43 which transmits a single communication signal with a same frequency through transmitter antennas 40$a$, 40$b$ and 40$c$ of gateway 18 to the satellites 12, 12' and 12''. The satellites 12, 12' and 12'' repeat the received signals and transmit them to the user terminal 13 with the same frequency. Because the satellites 12, 12' and 12'' are not co-located, each of the downlink transmissions will arrive at the user terminal 13 at a different time and thus experience a different multipath delay. The diversity combiner within the user terminal 13 combines the demodulated received signals and delivers the intended signal to the user.

A second forward link is established by the frequency determining unit 43' which transmits a single communication signal with the same frequency through transmitter antennas 40$a$ and 40$b$ of a second and up to N gateways 18' to the satellites 12' and 12'. The satellites 12' and 12'' repeat the received signals and transmit them to the user terminal 13' with the same frequency. As before, and because the satellites 12' and 12'' are not co-located, each of the downlink transmissions arrives at the user terminal 13' with a different multipath delay. The diversity combiner within the user terminal 13' combines the demodulated received signals and delivers the intended signal to the user.

Each of the frequency determining units 43 and 43' sends, under control of the associated controller 56 and 56', respectively, the uplink transmissions in accordance with a method that is detailed below.

It should be realized that the relative elevation angles of the satellites 12 change with respect to one another, as viewed from any particular gateway 18, as the satellites pass over the surface of the earth during each orbit. It should further be realized that the two gateways 18 and 18' may be separated from one another by hundreds or thousands of kilometers.

There may be a large number of users associated with each of the gateways 18. Furthermore, the constellation of satellites will have some number of satellites 12 that are simultaneously in view of the users and gateways. Generally the most advantageous communications operation has the users loaded onto the highest elevation angle satellite that is in view, in this case the satellite 12. However, to mitigate the effects of blocking and shadowing it is desirable to transmit through as many satellites as possible, even though some of the satellites that are in view may not be over the land mass where the user terminals 13 and 13' are located.

The transmitted spectrum is divided into several Frequency Division (FD) segments. Each segment is associated with a particular one of the gateways 18, and may or may not be present in all of the satellite beams. Control of the loading of the satellites 12 is based on the methods described below which may be executed by the master controller that is preferably resident within the GOCC 38, and which is transmitted to the controller 56 of the gateways 18 over the GDN 58. The methods may also be executed by the gateways 18, in cooperation with information received from the GOCC 38. The goal is to effect the allocation of system resources so as to load the satellites 12 such that no one satellite is overloaded with respect to the other satellites of the constellation that are within view of a gateway or gateways 18. One embodiment of the method operates in real time or near real time, while another embodiment operates in a predictive mode.

Figure 7:
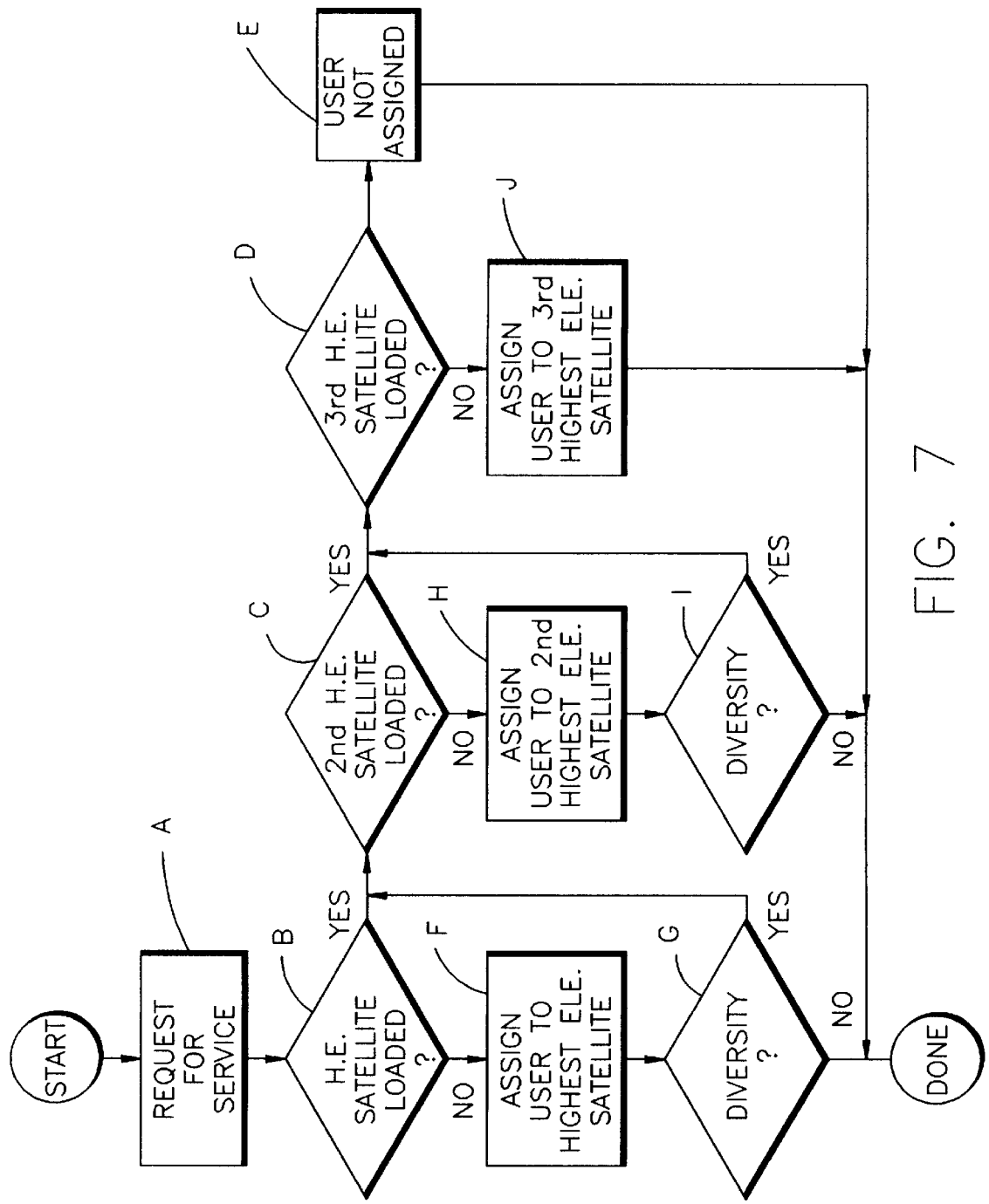
FIG. 7 is a logic flow diagram that illustrates a method of assigning communication traffic in accordance with this invention.

It is first noted that the GOCC 38 is aware of the total transmitted power of each satellite, in that the GOCC 38 has overall control of the loading of the satellites, and maintains a record of how many links are established between all of the gateways 18 and the satellites 12. Referring to FIG. 7, which assumes for this example that there are three satellites (12, 12' and 12") presently in view of the gateways 18 and 18', a request for service (Block A) is made to one of the gateways 18 or 18'. The request for service may be made in response to a need to establish a communication link with one of the user terminals 13, or may be generated so as to handoff an already established link from one satellite to another.

At Block B a determination is made if the highest elevation angle satellite is fully loaded with communications traffic. If Yes, at Block C a determination is made if the second highest elevation angle satellite is fully loaded with communications traffic. If Yes, at Block D a determination is made if the lowest elevation angle satellite is fully loaded with communications traffic. If Yes, at Block E the user is not assigned to any satellite as all of the satellites in view of a particular one of the gateways 18 are fully loaded.

If No at Block B the user is assigned to the highest elevation angle satellite 12, thereby establishing one communication link through one satellite. At Block G a determination is made if diversity reception is to be granted to the user, it being remembered that diversity reception is desired to mitigate the effects of fading. If No, the single communication link is maintained and the method terminates. If Yes at Block G control passes to Block C to determine if the second highest elevation angle satellite is fully loaded.

If No, then at Block H the user is assigned to the second highest elevation angle satellite 12' (if entering from Block B), or the user is also assigned to the second highest elevation angle satellite 12' (if entering from Block G).

At Block I a determination is made if diversity reception is to granted to the user, or if further diversity reception is to be granted if the user is already assigned to at least one satellite. If No the method terminates. If Yes at Block I then control passes to Block D to determine if the lowest highest elevation angle satellite is fully loaded.

If No, then the user is assigned to the lowest elevation angle satellite 12" (if entering from Block C), or the user is also assigned to the lowest elevation angle satellite 12" (if entering from Block I).

The decision as to whether to operate a particular user communication with diversity reception (Blocks G and I) can be based on a number of criteria, such as an actual system loading or a predicted system loading over some time period, such as the next n minutes. For example, during peak communication traffic periods it may be desirable to not operate in the diversity mode, or to operate in a reduced diversity mode through, by example, only two satellites.

The decisions made at Blocks B, C, and D can also be based on a number of different criteria. For example, one criterion may be based on whether a satellite is currently repeating some predetermined maximum number of communications links. If yes, then the satellite is considered to be fully loaded.

Another criterion may be based on a total power output of a given satellite. Another, related criterion is whether a given one of the satellite beams is operating at or near a power level that would exceed a predetermined peak flux density (PFD) as measured on the earth, such as −154 dBW/m$^2$/4 kHz. By example, a given satellite may be operating at 75% of the maximum total communication capacity, but a particular beam within which a new user requires service (or to which a user may be handed off) is operating at a power level that is equal to or very near to a level that would cause the RF energy from the beam to exceed the PFD limit on the earth. For this case the satellite may be considered to be fully loaded, and the user is thus assigned to a next lower elevation angle satellite.

The GOCC 38 may predict, based on current traffic loading and a historical record of traffic loading, an expected communications traffic loading over an interval of time. Based on this prediction one or more of the gateways 18 can be instructed to assign all new users to one or more of the satellites for, by example, the next five minutes.

Although described in the context of a spread spectrum communication system, it should be realized that the teaching of this invention also has applicability to other satellite communication systems that may utilize, by example, Time Division Multiple Access (TDMA) techniques. The teaching of this invention may also be applied to other than low earth orbit satellite communication systems.

Thus, while the invention has been particularly shown and described with respect to presently preferred embodiments thereof, it will be understood by those skilled in the art that changes in form and details may be made therein without departing from the scope and spirit of the invention.

What is claimed is:

1. A method for allocating communications traffic amongst a plurality of satellites of a constellation of low earth orbit satellites, each of the plurality of satellites being oriented, at any given time when in view of a user terminal, at a particular elevation angle, comprising the steps of:

providing each of the plurality of satellites with a receiver for receiving communication links from a ground station, transmitters for transmitting communication links to user terminals through frequency channels, receivers for receiving communication links from user terminals through the frequency channels, and a transmitter for transmitting communication links to the ground station;

in response to a request to one of assign a communication link to a user terminal or to handoff an already assigned communication link, determining if a highest elevation angle satellite can be assigned a new communications link;

if yes, assigning a new communication link to the highest elevation angle satellite;

if no, determining if a lower elevation angle satellite can be assigned a new communications link; and if yes, assigning a new communication link to a lower elevation angle satellite; wherein the steps of determining each include a step of determining if the satellite will be in view of both the user terminal and the ground station for a predetermined period of time and, if not, the satellite is not accepted for being assigned the new communication link; and wherein the steps of determining are each also performed in accordance with a predicted communications traffic loading for the satellite.

2. A method as set forth in claim 1, wherein each of the steps of determining include the further steps of:

determining if the communication link is to be operated in a diversity mode;

if yes, determining if at least one next lower elevation angle satellite can be assigned a new communications link; and if yes, also assigning the communication link to the next lower elevation angle satellite such that the communication link is simultaneously conducted through at least two of the satellites.

3. A method for allocating communications traffic amongst a plurality of satellites of a constellation of non-geosynchronous satellites, each of the plurality of satellites being oriented, at any given time when in view of a user terminal, at a particular elevation angle, comprising the steps of:

generating a request to assign a communication link to a user terminal;

in response to the generated request, operating a ground station to assign the communication link to at least two satellites that are selected as having the highest elevation angles relative to the user terminal, in accordance with at least a current satellite communications traffic loading and a predicted satellite communications traffic loading for each of the plurality of satellites that are in view of the user terminal and the ground station, so as not to exceed a maximum satellite communications traffic loading for a given one of the satellites; and operating the user terminal so as to coherently combine a communication signal received from said at least two satellites over the assigned communication link.

\* \* \* \* \*